M8414 CR RE 21,117 Eva

BEST AVAILABLE COPY

June 13, 1939. A. R. VISITACION Re. 21,117 orig. 2,132,500

HAIR CURLER

Original Filed May 25, 1937 2 Sheets-Sheet 1

ANICETO · R · VISITACION · INVENTOR

BY Mueller & Ruhl

ATTORNEYS

Claims 11, 12, 13 & 15 held valid Thos. Manning Mfg Co. v. Glenco Co. 136 F. (2d) 961

June 13, 1939. A. R. VISITACION Re. 21,117

HAIR CURLER

Original Filed May 25, 1937 2 Sheets-Sheet 2

D.C.N.Y.
Claims 11, 12, 13 and 15
held valid and infringed
Hollywood Comb Curler v.
Glemby Co., 47 F. Supp. 732

C.C.A.N.Y.
Claims 11, 12, 13 and 15
held valid
Monogram Mfg. Co. v. Glemby Co.
136 F. (2d) 961

ANICETO. R. VISITACION INVENTOR

BY Mueller & Ruhl

ATTORNEYS

Reissued June 13, 1939

Re. 21,117

UNITED STATES PATENT OFFICE 21,117

HAIR CURLER

Aniceto R. Visitacion, New York, N. Y.

Original No. 2,132,500, dated October 11, 1938, Serial No. 144,587, May 25, 1937. Application for reissue January 7, 1939, Serial No. 249,819

15 Claims. (Cl. 132—33)

This invention relates to improvements in hair dressing appliances and has particular reference to a curler.

An object of the invention is to provide an efficient hair curling implement to which the ends of hair strands are secured upon a tubular mandrel, thereafter coiled by winding thereon as closely as possible to the scalp, the coils thus formed being released by drawing the mandrel lengthwise, and becoming engaged between the spring prongs of a clamp or bobbie pin carried by the mandrel in open position.

A further object is the provision of an easily operated curling implement, that may be subjected to heat without damage, is readily cleansed, capable of long continued service, and is of such simplicity as to be inexpensive to construct.

Another object is to make the hair curler wholly and entirely of one single piece of material, having no additional attached or detached parts whatever, save the customary curl clamp or bobbie pin.

These valuable objects are accomplished by the novel construction and arrangement of parts hereinafter described and illustrated in the accompanying drawings, which include preferred embodiments of the inventive idea.

Figure 1:
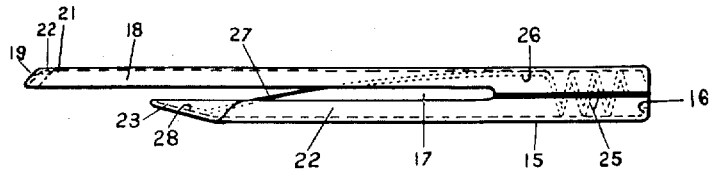
Figure 1 is a side elevational view of one embodiment of the invention.
Figure 2:
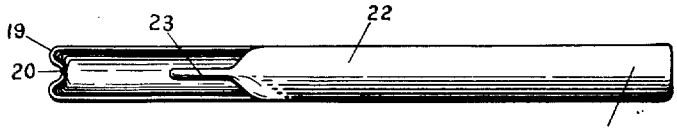
Figure 2 is a top plan view thereof.
Figure 3:
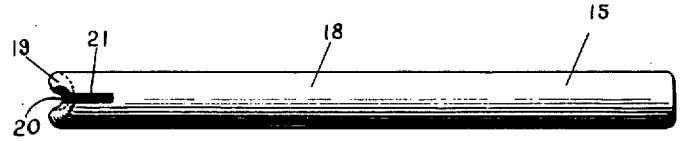
Figure 3 is a bottom plan view of the same.

The main feature of the invention, as will be seen by inspection of the drawings, is its extreme simplicity, the device consisting of a hollow cylindrical body 15, preferably partially closed at one end 16, as shown in Figures 1 to 6.

Longitudinal slot 17 formed in opposed portions of the body divides the same throughout the greater portion of its length into two sections 18 and 22, relatively long and short.

The longer portion 18 has its end 19 downturned and contains a central depression 20, while a narrow recess 21 leads from the depression towards the opposite end, the bottom of the recess being inclined upwardly as indicated.

The opposite body portion 22 is far shorter in length; its forward end 23 compressed laterally and tapered to a rounded point.

The coils 25 of a spring wire are fitted in the body 15, at its closed rear end, the wire continuing along the inner side of the body section 18, as at 26, then bent angularly, as at 27, to contact the section 22 and finally entered into the contracted end 23, as at 28, by which the end of the wire is firmly anchored.

The clamp or bobbie pin used in connection with the mandrel, usually consists of a plain straight arm Y, a corrugated arm Z and loop X.

The arm Y of the pin is entered under the open end of the longer section 18, while the shorter arm Z is guided in the recess 21, raising its end from the surface of the mandrel and tensioning the lower arm in a manner well understood.

Figure 6:
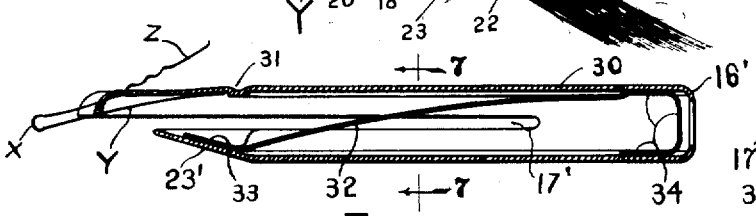
Figure 6 is a longitudinal sectional view of another modification in construction.
Figure 7:
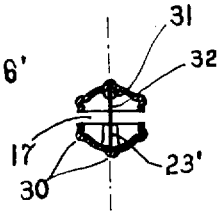
Figure 7 is a transverse sectional view taken on line 7—7 of Figure 6.
Figure 5:
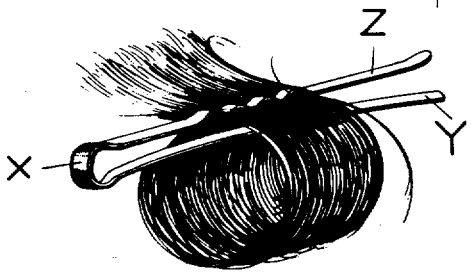
Figure 5 is a perspective view of the curl produced and its holding means.
Figure 8:
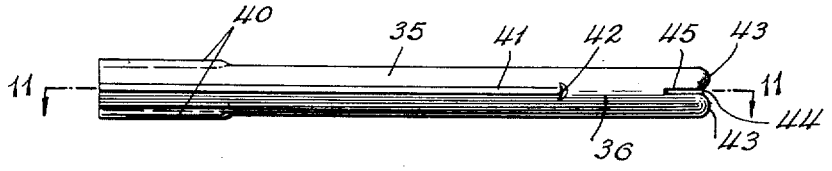
Figure 8 is a side elevational view of still another embodiment of the device.

In the modification shown in Figures 6 and 7, the body of the mandrel is shaped to produce a series of longitudinal hollow ribs 30, and at a point near the front is a depressed node 31 to act as a stop for the pin arm Y, limiting its entrance into the curler mandrel.

A flat spring wire 32 has its end 33 anchored in the front end 23' of the shorter section and at its rear fashioned into an angular spring loop 34, the sides of which are closely fitted to the inner, hollow surfaces of the ribs 30, adjacent the partially closed end 16' of the mandrel body so as to be retained in operative position.

In operation, the ends of the lock of hair to be curled are entered into the slot 17—17', and clamped by the spring 27 or 32 frictionally tight; thereafter the mandrel is turned by the fingers until as close to the scalp as possible, the bobbie pin inserted, its arm Z being raised, whereupon the coil is drawn over the front end of the man-

BEST AVAILABLE COPY drel and engaged between the arms of the pin, completing the curling.

In the embodiments of the device shown in Figures 8–12, the mandrel 35 comprises a metallic tube formed from a single sheet of suitable material and having arms 36 and 37 respectively long and short, these arms being partially separated by opposed slots 38 extending from the front end approximately three quarters of the length of the tube.

The shorter arm 37 is reduced in width as it approaches the smoothly rounded point 39 to permit easy entrance of a lock of hair.

The rear portion of the tube may be reinforced by ribs 40, one of which, 41, directly opposite the shorter arm, is extended towards the front, its forward end terminating at an inturned lug 42.

Figures 9, 10, 11:
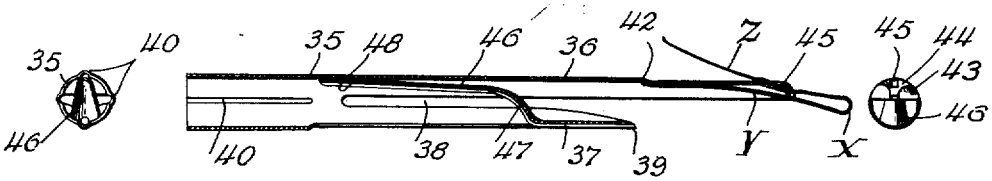
Figure 9 is a front end view thereof looking from the bifurcated end.
Figure 10 is a similar view looking from the opposite or rear end.
Figure 11 is a longitudinal sectional view taken on line 11—11 of Figure 8.
Figure 12:
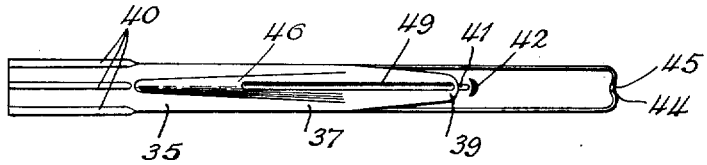
Figure 12 is a side view showing the reverse side of the implement from that illustrated in Figure 8.

The longer arm 36 is formed to project inwardly, forming cheeks 42 having between them a depression or saddle 44 from which a narrow recess 45 extends rearwardly, its bottom being outwardly inclined, as best seen in Figure 11.

Figure 4:
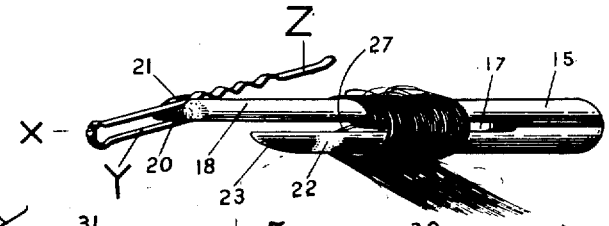
Figure 4 is a perspective view indicating its application.

A bobbie pin X, or like hair clamping means, is mounted in position as in Figure 4, its entrance being limited by reason of the extremity of its arm Y contacting the lug 42, while the outer arm Z is guided laterally by the recess 45, the saddle 44 acting to spread the arms of the pin.

The shorter arm 37 is sheared or otherwise cut to produce an integral spring 46 curved, as at 47, towards the opposite side of the tube, where its inner end portion 48 normally contacts the inner surface of the arm 36. A stiffening rib 49 may be used to reinforce the spring if required.

Figures 13, 14:
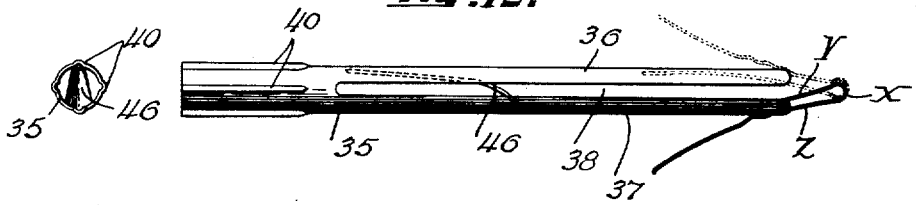
Figure 13 is a side elevational view of a slightly modified form of the curler as seen from the slotted side.
Figure 14 is an end view thereof.

In the modification shown in Figures 13 and 14 the arms are substantially of equal length and either of them may receive the bobbie pin as shown in full and dotted lines in Figure 13.

In operation, a lock of hair is engaged at its outer end by being entered into the slot 38, from either side, and pressed towards the rear of the tube sufficiently to become held tight by the spring 46, the bobbie pin having previously been attached in the manner shown.

When the tube is rotated by hand the hair will be wound upon it as closely to the scalp as possible, the tube drawn outwardly, causing the curl thus formed to become engaged by the bobbie pin, and there retained for such length of time as may be desired.

Although the improvements have been described with considerable detail and with respect to certain particular forms of the invention, it is not desired to be limited to such details since many changes and modifications may well be made without departing from the spirit or scope of the invention in its broadest aspect.

In explanation of the terminology of the claims appended, and particularly of those numbered 8 and following, it is to be observed that the undivided and unslotted portion of the body may be considered as illustrative of a handle or handle portion, and that the longer of the two sections or arms, such as the arm 18 of Figure 1 or 36 of Figure 11, are illustrative of what may aptly be termed a curling arm projecting from the handle.

The shorter section or arm, as for instance the section or arm 22 of Figure 1 or 37 of Figure 11, together with the resilient member 27 (Figure 1) or 32 (Figure 6) or 46 (Figure 11) supported on, or formed as a part of that arm in Figure 11, or the resilient member itself may be considered illustrative of a hair holding member or means which is also supported on and projects from the handle along the portion of the curling arm that is adjacent the handle. Such member or means defines the curl winding zone in which a curl may be wound about both arms of the device.

The hair pin holding portion of the longer arm of the device is so located on and by the length of that longer arm that the hair pin is supported in a position such that it does not interfere with or overhang a curl in the winding zone.

At the same time, the hair pin, whether inserted before or after winding the curl, is always in a position to catch and hold the curl as the curling arm is slipped out of it. The pin being spread wide open and in widely and unrestrictedly spaced relation to the relatively smooth contoured surface of the curling arm, the curl is easily slipped along the arm into the open transfer space under the pin.

The fact that the leg Z of the pin is thus spaced throughout a major portion of its length provides a transfer space of such length that the curl may be wholly slipped into pin engagement under the pin without substantially disturbing the curl and without moving the pin; the pin and the curl being then removed from the arm together after the curl has been pinned.

The transfer, or pinning zone, under the pin, does not over-lap the zone in which the curl may be wound free of interference by the pin.

What is claimed is:

1. A hair curling appliance comprising a hollow cylindrical mandrel composed of two members of unequal length partially separated by longitudinal slots adapted to receive the ends of a lock of hair, means at the outer end of the longer member forming a mounting for a hair pin, and a spring having one end positioned in the shorter member and its other end located within the mandrel, said spring passing obliquely through the center of the mandrel from one of the members thereof to the other.

2. A hair curling appliance comprising a hollow cylindrical mandrel composed of two members of unequal length partially separated by longitudinal slots adapted to receive the ends of a lock of hair, means at one end of the longer member to engage a hair pin, means limiting the entrance of the pin, a spring recessed in the front end of the shorter member and extending diagonally upward and rearward to the longer member, and means to secure the rear end of said spring in the mandrel at its rear portion.

3. A hair curling appliance comprising a hollow cylindrical mandrel composed of two members of unequal length partially separated by longitudinal slots adapted to receive the ends of a lock of hair entered from its open end, a plurality of ribs arranged at spaced intervals on said mandrel extending longitudinally thereof, said shorter member having a contracted socket at its forward extremity, a spring engaged in said socket and extending diagonally rearward to the longer member in intersecting relation to the plane of said slots, and a loop on the rear portion of said spring to engage the inner surfaces of said ribs.

4. A hair curling appliance comprising a unitary tubular mandrel slotted longitudinally to present two spaced members relatively long and short, means associated with said members to resiliently clamp a lock of hair entered therebetween, and a tapered recess formed in the longer member of said mandrel to temporarily retain a hair pin in position to receive the curl produced by winding the hair upon the mandrel.

5. A hair curling appliance comprising a tubular body slotted longitudinally for a major portion of its length, a depression formed in the one end of the body, a recess formed in said depression and leading therefrom in the outer surface of the body to receive an arm of a bobbie pin, and a spring arm extending from one side of said body to the other in intersecting relation to the plane of the slot in said body.

6. A hair curling appliance comprising a tubular body bifurcated to receive a lock of hair between its side portions, means formed in the end of one side portion to receive and retain a bobbie pin, and a spring integrally inbent from the opposite side to extend diagonally to contact the first named side at a point remote from the pin holding means.

7. A hair curling appliance comprising a tubular body formed wholly from a single blank of sheet metal to produce opposed slots open at one end and closed at the other and to further produce a spring struck from one portion of said body to extend diagonally across said slot.

8. A hair curling device comprising a handle, an elongated one-piece curling arm projecting from the handle and having a hair pin carrying portion at its free end, another member supported from said handle and extending along and close to the portion of said curling arm which is adjacent the handle, said last mentioned member defining a zone in which a curl may be wound about both said member and said curling arm, said hair pin carrying portion being provided with a longitudinally extending cavity adapted to receive one leg of a hair pin and being provided with an end formation adapted to spread the two legs of the applied pin so that the other leg of the pin projects along said pin carrying portion with its free end spaced outwardly of the latter and longitudinally spaced from the curl winding zone so as not to overhang a curl in that zone while yet adapted to catch the curl as the arm is slipped out of the curl.

9. A hair curling device comprising a handle, an elongated one-piece curling arm projecting from the handle and having a hair pin carrying portion at its free end, a hair holding means supported from said handle and extending along the portion of said curling arm which is adjacent the handle, said hair holding means defining a zone in which a curl may be wound about the curling arm and holding means, said hair pin carrying portion being provided with a longitudinally extending cavity adapted to receive one leg of a hair pin and being provided with an end formation adapted to spread the two legs of the applied pin so that the other leg of the pin projects along said pin carrying portion with its free end spaced outwardly of the latter and longitudinally spaced from the curl winding zone so as not to overhang a curl in that zone while yet adapted to catch the curl as the arm is slipped out of the curl.

10. A hair curling device comprising a handle, an elongated one-piece curling arm projecting from the handle and having a hair pin carrying portion at its free end, a resilient hair holding means supported from said handle and extending along the portion of said curling arm which is adjacent the handle, said hair holding means defining a zone in which a curl may be wound about the curling arm and holding means, said hair pin carrying portion being provided with a longitudinally extending cavity adapted to receive one leg of a hair pin and being provided with an end formation adapted to spread the two legs of the applied pin so that the other leg of the pin projects along said pin carrying portion with its free end spaced outwardly of the latter and longitudinally spaced from the curl winding zone so as not to overhang a curl in that zone while yet adapted to catch the curl as the arm is slipped out of the curl.

11. A hair curling device comprising a handle, an elongated one-piece curling arm projecting from the handle and having a hair pin carrying portion at its free end, a hair holding means supported from said handle and extending along the portion of said curling arm which is adjacent the handle, said hair holding means being shorter than the curling arm, said hair pin carrying portion of the curling arm substantially lying beyond the end of said holding means and being provided with a longitudinally extending cavity adapted to receive one leg of a hair pin and with an end formation adapted to spread the two legs of the applied pin so that the other leg of the pin projects along the pin carrying portion with its free end spaced outwardly from the latter and longitudinally spaced from said holding means.

12. A hair curling device formed as an integral body and comprising a handle portion, an elongated one-piece curling arm integral with and projecting from the handle portion and having a hair pin carrying portion at its free end, a hair holding portion supported from and integral with said handle portion and extending along the portion of said curling arm which is adjacent the handle portion, said hair holding portion defining a zone in which a curl may be wound about the curling arm and the holding portion, said hair pin carrying portion being provided with a longitudinally extending cavity adapted to receive one leg of a hair pin and being provided with an end formation adapted to spread the two legs of the applied pin so that the other leg of the pin projects along said pin carrying portion with its free end spaced outwardly of the latter and longitudinally spaced from the curl winding zone so as not to overhang a curl in that zone while yet adapted to catch the curl as the arm is slipped out of the curl.

13. A hair curling device comprising a handle, an elongated one-piece curling arm projecting from the handle and having a hair pin carrying portion at its free end, another member supported from said handle and extending along and close to the portion of said curling arm which is adjacent the handle, said last mentioned member defining a zone in which a curl may be wound about both said member and said curling arm, said hair pin carrying portion being provided with a longitudinally extending cavity adapted to receive one leg of a hair pin and being provided with an end formation adapted to spread the two legs of the applied pin so that the other leg of the pin projects along said pin carrying portion with its free end spaced outwardly of the latter and longitudinally spaced from the curl winding zone so as not to overhang a curl in that zone while yet adapted to catch the curl as the arm is slipped out of the curl, said cavity and end formation being so disposed that said other leg of the pin is on the opposite side of said curling arm from said last mentioned member.

14. A hair curling device comprising a handle, an elongated one-piece curling arm projecting from the handle and having a hair pin carrying portion at its free end, another and shorter arm supported from said handle and extending along and close to the portion of said curling arm which is adjacent the handle, a resilient hair holding member carried by said last mentioned arm, extending along the portion of the curling arm which is adjacent the handle, and acting resiliently to hold a strand of hair between it and said portion of the curling arm, said last mentioned arm defining a zone in which a curl may be wound about both said arms, said hair pin carrying portion being provided with a longitudinally extending cavity adapted to receive one leg of a hair pin and being provided with an end formation adapted to spread the two legs of the applied pin so that the other leg of the pin projects along said pin carrying portion with its free end spaced outwardly of the latter and longitudinally spaced from the curl winding zone so as not to overhand a curl in that zone while yet adapted to catch the curl as the arm is slipped out of the curl.

15. A hair curling device comprising a handle, an elongated curling arm projecting from said handle and having a hair pin carrying portion at its free end, a hair holding means supported from the handle and extending along the portion of said curling arm that is adjacent the handle, said hair holding means defining a zone in which a curl may be wound about the curling arm and holding means, said hair pin carrying portion being provided with a longitudinally extending cavity adapted to receive one leg of a hair pin and being provided with an end formation adapted to spread the two legs of the applied pin so that the other leg projects for a major portion of its length along said hair pin carrying portion, but freely angularly spread outwardly from said portion and longitudinally spaced from the curl winding zone, all so that there is formed between the spread pin-leg and the curling arm from the arm end to the pin-leg end a free and unrestricted transfer throat separate from the curl winding zone and of a length substantially equal to a major portion of the pin-leg length.

ANICETO R. VISITACION.